US012453302B2

(12) United States Patent
Spinsanti

(10) Patent No.: US 12,453,302 B2
(45) Date of Patent: Oct. 28, 2025

(54) SEED DISTRIBUTOR USED FOR AGRICULTURAL MACHINES

(71) Applicant: Ariel Alberto Antonio Spinsanti, Provincia Santa Fe (AR)

(72) Inventor: Ariel Alberto Antonio Spinsanti, Provincia Santa Fe (AR)

( * ) Notice: Subject to any disclaimer, the term of this patent is extended or adjusted under 35 U.S.C. 154(b) by 1086 days.

(21) Appl. No.: 17/437,086

(22) PCT Filed: Sep. 19, 2019

(86) PCT No.: PCT/IB2019/057948
§ 371 (c)(1),
(2) Date: Sep. 8, 2021

(87) PCT Pub. No.: WO2021/053376
PCT Pub. Date: Mar. 25, 2021

(65) Prior Publication Data
US 2022/0159901 A1  May 26, 2022

(51) Int. Cl.
*A01C 7/04*  (2006.01)
*A01C 19/02*  (2006.01)

(52) U.S. Cl.
CPC .............. *A01C 7/046* (2013.01); *A01C 19/02* (2013.01)

(58) Field of Classification Search
CPC ............ A01C 7/04; A01C 7/044; A01C 19/02
See application file for complete search history.

(56) References Cited

U.S. PATENT DOCUMENTS

| | | |
|---|---|---|
| 3,990,606 A | 11/1976 | Gugenhan |
| 9,265,191 B2 | 2/2016 | Sauder et al. |
| 9,282,692 B2 | 3/2016 | Kinze |
| 9,578,799 B2 | 2/2017 | Allgaier et al. |
| 9,961,825 B2 | 5/2018 | Allgaier et al. |
| 2017/0311535 A1 | 11/2017 | Sauder |

FOREIGN PATENT DOCUMENTS

| | | | | |
|---|---|---|---|---|
| WO | WO-9602123 A1 | * | 2/1996 | ............ A01C 7/046 |
| WO | WO-2008043702 A1 | * | 4/2008 | ............ A01B 23/06 |
| WO | WO2014066157 | | 5/2014 | |
| WO | WO2014066168 | | 5/2014 | |

* cited by examiner

Primary Examiner — Alicia Torres
(74) Attorney, Agent, or Firm — Defillo & Associates. Inc.; Evelyn A. Defillo

(57) ABSTRACT

A seed metering device for an agricultural machine having two distal and parallel vertical shell housing a vertical metering disk rotating on its axis. The disk has at least one set of annular seed cells, an annular recess opposite the inner face of the rear shell, and is formed by a portion of the disk wall projecting towards the front end of the rear shell, followed by a disk portion perpendicular to in the direction of the axis, continued by an oblique wall towards the back portion of the shell and it ends in a first cylindrical bushing coaxial to the shaft.

5 Claims, 7 Drawing Sheets

SEED DISTRIBUTOR USED FOR AGRICULTURAL MACHINES

CROSS REFERENCE TO RELATED APPLICATION

This application is a national stage entry of PCT/IB2019/057948 filed Sep. 19, 2019, under the International Convention.

TECHNICAL FILED OF THE INVENTION

This instant invention finds its field of application in a seed distributor of the type that comprises a casing within which rotates a vertical metering disk, supplying seeds onto the furrow. Particularly, the present invention covers a distributor that avoids the inconveniences found in the similar devices of the prior art, applied to a sowing machine.

PRIOR ART

It is widely known in the art of agricultural machinery, and particularly in seeders, the use of seed metering devices basically consisting of a vertical closed casing within which a distributor plate or disk rotates in a vertical position. This disk has a plurality of recesses or seed cell apertures, preferably equal to each other, annularly located in the shape of a crown adjacent to the disk's periphery, delivering granulated metered inputs, such as seeds.

In its most basic form, said casing creates a source for a supply of seeds in communication with at least one annular set of seed cell apertures belonging to said distribution disk or plate, providing separating means of at least one seed to be lodged and transported within each seed cell aperture, delivering each seed to a discharge zone placing said metered seed on the sowing furrow. In principle and preferably, but without this implying any limitation, within said distributor plate or disk, into each seed cell aperture of the at least one annular set of seed cell apertures it is lodged one seed at a time.

This seed distributor disk arranged within its casing housing rotates about a substantially horizontal axis. As this disk rotates, each one of its seed cell apertures is placed fronting the seed supply from which it withdraws (ideally) a single seed at a time, lodging as above said, a single seed in each successive seed cell aperture of said disk within which it is retained by suction or negative pressure and transported through the length of an arc of the angular displacement of the disk. At a point of said angular displacement, ideally close to the vertical, the suction or negative pressure ceases and the seed is then released from the disk and delivered to a seed outlet that directs it to the planting furrow.

Enlarging on this above construction, the aforementioned casing provides a source of pneumatic vacuum attracting and housing a seed at each consecutive seed cell aperture. The seed by means of this vacuum is thus retained and transported, travelling together with the disk until reaching a location close to the vertical where the effect of the pneumatic vacuum ceases, whereby the seed falls into an outlet duct of the casing, said seed being supplied to (e.g,) said sowing furrow.

For the purposes of the present invention, although the term "seed" is used throughout it, these disks having said annularly crown seed cell apertures can be used for metering and delivering on the ground (e.g, in the sowing furrow) any other granulated input compatible with the volume of the recess given by said seed cell aperture into which is housed, so that the use of the noun "seed" should not be considered as a limiting factor to the scope of the invention while using this term "seed" in a generic way, and same can range from granular fertilizers to include pesticides, fertilizing pellets, and of course all kinds of seeds.

In the known seed metering devices of this kind, the distributor disk or metering plate is driven in rotation vertically around its axis by a small electric motor placed external to said casing, introducing a shaft inside said casing at the end of which is located a cylindrical gear engaging and driving a complementary annular set of teeth forming a ring gear at said disk.

By way of example, US patent n° 9,282,692; PCT/US2013/065630; and PCT/US2013/065673, in name of KINZE MANUFACTURING, Inc., illustrate a distributor plate or disk in which is provided a ring gear with female teeth immediately below the set of annular seed cell apertures. This implies the aforementioned female toothed ring is practically coplanar with the disk's flat portion on its same face wherein the annular seed cell apertures is provided, so that in order for the cylindrical gear to be able to work it must rotate within an annular depression, coaxial to the axis of said distributor disk and placed immediately below said annular set of annular seed cell apertures.

The depression within which said cylindrical gear acts and the ring of annular seed cell apertures arranged above it lies practically in the same vertical plane, for which reason it is not possible to construct a hermetic enclosure for said gear, physically isolated from said annular set of annular seed cell apertures, rendering it free of dust or seed fragments, whereby the powders created by the seed supply, as well as the seed fragments that may enter inside the aforesaid depression are broken by the referred cylindrical gear acting against the toothed ring, creating an additional problem for the movement transmission by these means, since the distribution plate or disk can get stuck or even be damaged by the inclusion of fragments of different hardness between the transmission teeth, as well as a problem for clearing said annular seed cell apertures.

Instead, for example, and among others, patents U.S. Pat. No. 9,265,191B2; U.S. Pat. No. 9,578,799B2; U.S. Pat. No. 9,961,825B2 and publication US 2017/0311535 A1, belonging to Precision Planting LLC, have a crown with male teeth almost coplanar to the set of annular seed cell apertures and arranged above it, in the same periphery of the disk, obtaining the same failures about preventing the dust and broken seed residue from entering into said transmission means that may jam the teeth of the cylindrical gear or interfere with the annular seed cell aperture recesses by taking their place instead of the seed. In fact, in these other constructions, the toothed crown is in direct communication with the enclosure into which the seeds are sucked into each annular seed cell aperture for their individual angular transport movement and dosage to the sowing furrow.

Likewise, in the constructions of known disk metering devices, if the aforementioned transmission by means of the individual electric motor meshing the cylindrical gear in the aforementioned toothed rings is omitted, then said disk must be rotated on its axis by means of a transmission driven directly on its axis or coaxial to it, depending on the construction. However, in the prior art, said transmissions are provided on the front face of the casing due to the fact that the fastening means of said casing are placed linked on its rear face to the frame of the sowing machine, wherein also the feeding inlet of the seeds to the device is provided. By having the axial transmission placed on the front face of the casing, which according to the prior art is free of obstacles, this implies that changing each disk placed into each casing, involves first uncoupling from the driving shaft the entire transmission train, in order to be able to remove the cover or front panel of said casing, thus gaining entrance to the inside of said casing accessing the retention means of said metering disk. Considering that sowing machine frames or planters are supporting sowing lines each having dozens of these devices, this disk changing operation is labour-intensive and therefore implies a considerable cost due to downtime.

It turns out then that quick and easy access to the interior of the casing and ease of removing the distributor disk is matter of fundamental importance. We must not lose sight of the fact that the crown of cavities or annular seed cell apertures, for example, for sowing wheat, differs fundamentally in their individual volume and sometimes even in its shapes or perimeter profile of the annular seed cell aperture, from the cavities for sowing soybeans or other granulated inputs. Consequently, every time the vegetal species or the granulated supply to be metered and sowed is changed, the distribution or metering disks must be changed to adapt their annular seed cell aperture cavities to the average size of the input to be distributed.

DISADVANTAGES FOUND IN PRIOR ART CONSTRUCTIONS

As above mentioned, we can synthesize as follows the drawbacks found in the prior art, drawbacks to which the present invention offers a novel solution:

i. In the prior art, if the transmission is performed by the aforementioned small individual electric motors providing the individual rotational motion for each metering plate or disk, the toothed crowns on the disk or plate together with the motorization gear will work within an environment in relative contact with the annular plane wherein the annular seed cell are placed, causing accumulation of powders and remains or seed detritus broken by the coupling of the cylindrical gear and the toothed ring, since if a seed falls between said gear teeth it breaks and it can occupy part of the volume of the annular seed cell recess, making it impossible, depending on the size of the split grain housed therein, to further lodge therein an undamaged seed for its deposition in the sowing furrow, giving rise to losses during sowing;

ii. In the prior art, the drive of the ring gear/cylindrical gear assembly takes place in an environment which is not isolated from the rest of the distribution disc;

iii. If the rotational movement of the metering plate or disk is carried out by applying a torsional moment on its central axis, in the prior art this movement is applied from the front face or free face of the casing, the rear face or opposite face of the casing being only destined to be attached to the sowing machine's frames and to receive the seeds that enter the aforementioned casing. This entails that in order to change the metering disk or plate, it is first necessary to disassemble the drive mechanism of the central axis driving said disk, to be able to remove the vertical disk or plate, with the consequent losses of time and increase in overtime and unproductive time of the sowing machine.

OBJECTS OF THE PRESENT INVENTION

First object of the invention is a seed metering device applied to agricultural machines, of the kind comprising a casing made up of a rear end and a front end, which, when assembled, defines an inner volume inside which a vertical metering disk rotates provided with at least one annular set of seed cells of individually spaced successive depressions or recesses. According to this first object of the invention, said metering disk or plate provides an isolated and closed enclosure avoiding the entry therein of seeds and powders, enclosure within which the rotational movement of the vertical distributor disk or plate occurs by the action of the driven cylindrical gear powered by an individual motor means, such as a small electric motor, cooperatively coupled to a female ring gear integral to said disk or plate.

It is an object of the invention that said cylindrical gear and said ring gear are placed within said closed enclosure within which they operate, said enclosure being physically separated and isolated from the at least one annular set of seed cells as well as from the entry port for the seeds into the casing for its subsequent lodging of one seed per seed cell and its angular displacement.

It is also an object of the invention that if the rotational driving of the metering disk or vertical metering plate is achieved by applying a torque force on the axial shaft of said disk or plate, said torque force is applied from the rear end of the metering device, that is, from the rear face of the casing thereof.

It is also an object of the invention that the disk assembly lock is carried out by means of a bayonet lock so that by means of an angular displacement on the plate with the immobilized shaft, the plate is disengaged for its prompt replacement. being able to assemble the new plate or disk in the same way.

It is object of the invention that in order to change the metering plate or disk, it is only necessary to remove the front cover of the casing with all its accessories assembled with it, leaving exposed the metering disk or plate, which can be removed and/or assembled without altering the means for transmitting the rotational movement of said disk.

It is also an object of the invention that the disk removal and assembly can be carried out without the use of any tools performing only two successive manual operations.

SUMMARY OF THE INVENTION

SEED METERING DEVICE APPLIED TO AGRICULTURAL MACHINES, the kind comprising a vertically arranged casing made up by a rear shell and a frontal shell, both peripherally linked to define an inner volume, within which is placed at least a vertically arranged metering plate or disk; an entry for the seeds is provide at the rear portion of the casing, being said seeds taken by a pneumatic vacuum source and housed one by one within a plurality of annularly arranged seed cells forming at least one crown of cells adjacent to the periphery of the face of said metering plate or disk in communication with said seed inlet; the metering disk with the seeds lodged in said seed cells rotates on its axis, releasing said seeds when the pneumatic retention vacuum on the seed in the corresponding seed cell ceases, being the released seeds led to an outlet in communication with the sowing furrow; said metering disk or plate has its rotating driving means selectively composed of a rotational force applied on the axis of the disk, to which said plate or disk is linked, or by an annular set of teeth forming a ring gear at said disk engaged to a cylindrical gear driven by motor means, rotating said gear by means of a shaft emerging from the rear portion of the casing, characterized in that said metering disk or plate, on the same face carrying the seed cells recesses, and inwardly towards its axis, and following its at least one annular ring of seed cells has an annular recess facing the inner face of the rear shell; said annular recess is formed by a portion of the disk wall projecting towards the inner face of the front shell, followed by a disk portion in the direction of the axis thereof, after which it presents a wall obliquely projecting towards the rear shell, where it ends in a cylindrical bushing coaxial to said axis projecting towards the front portion of the shell; at the inner end of said annular recess the metering disk or plate has an annular ring gear with male teeth, in which the cylindrical gear driven by said motor means cooperatively engages; against the wall portion of the recess of the disk projecting in direction of the rear shell faces an annular flange parallel to said wall portion and belonging to a plate through which the shaft of cylindrical gear penetrates, while the axis of the metering disk or plate is passing through said plate, determining the annular wall of said plate the separation of the interior space within said casing between said metering disk and the inner face of the rear shell the casing providing two volumes not communicating with each other; a first of these volumes communicates with the seed inlet and the at least one annular crown of seed cells, while a volume, separated and isolated from the first, defines an area free of dust and seeds wherein the cylinder gear and the ring gear performs; the cylindrical bushing coaxial to the axis in turn is arranged on a second bushing coaxial to the first, the end of the second bushing having means for locking the disk with respect to the second bushing, cooperating with seats made at the end of the first bushing; the rotational movement being applied externally on the axis of the disk from the rear shell of said casing.

BRIEF DESCRIPTION OF THE FIGURES

In order to provide a construction of a preferred embodiment of the present invention, the following illustrative drawings are attached, in support of its description below rendered, while this embodiment should be interpreted as one of many possible constructions of the invention, therefore it is not appropriate to assign any limiting value to it, including within the scope of protection of the invention the possible means equivalent to those illustrated. The scope of the present invention being determined by the first claim appended in the corresponding Claims chapter.

Also, in these Figures, the same references identify equal and/or equivalent means.

DETAILED DESCRIPTION OF THE INVENTION

Figure 1:
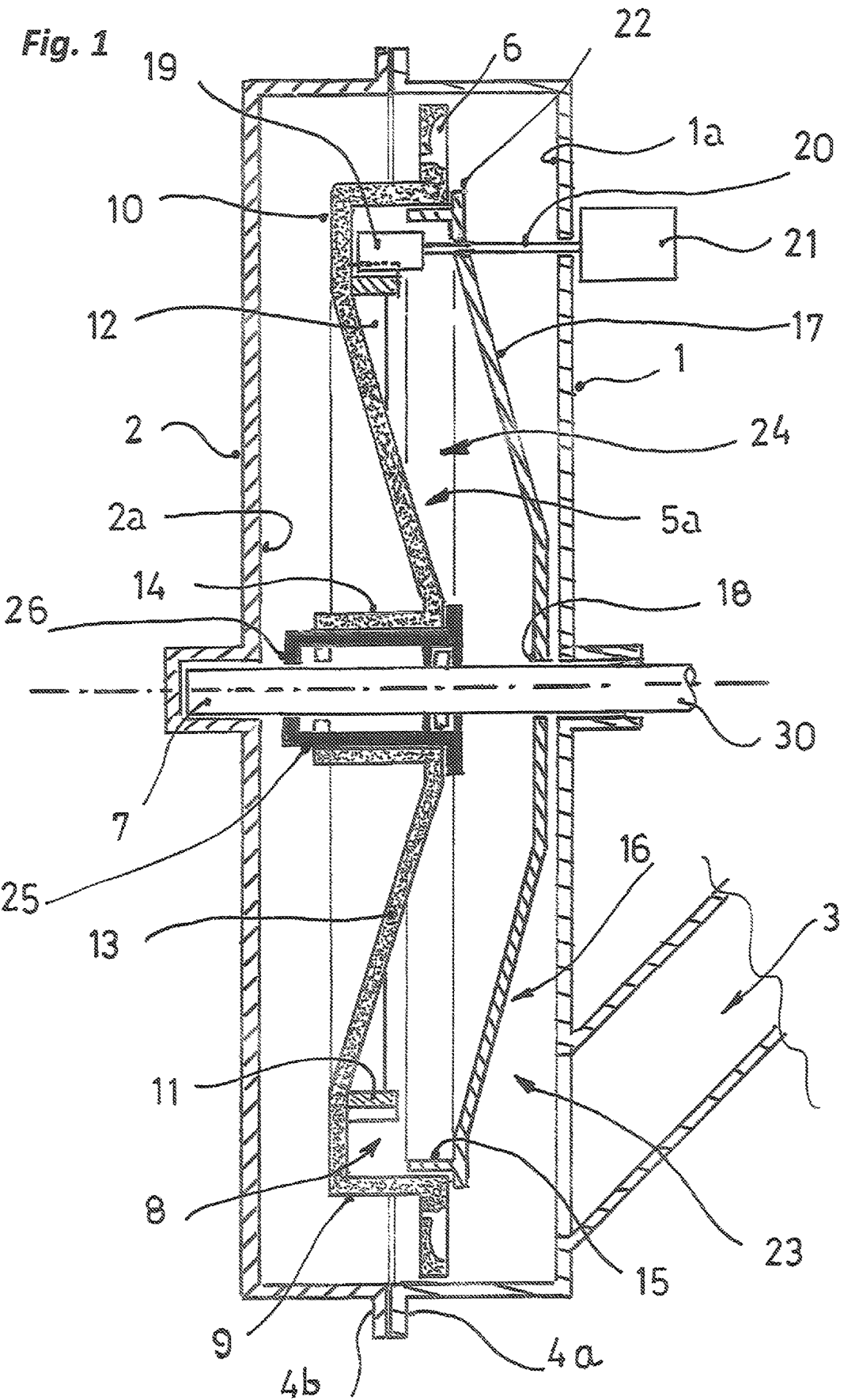
FIG. 1 shows a cross section of a basic and very schematic embodiment of the invention, omitting in this figure all the additional components known in the art and necessary for the operation of this device.

FIG. 1 shows in a diametrical cross-section a simplified rendering of the present invention, having deleted from this figure any other public domain component that unnecessarily may clutter this figure, considering these components while necessary for the correct working of this metering device, are not actually needed in order to properly understand the novelty of this instant invention. In this figure reference (1) indicates the rear shell of the casing, while (2) is its front shell. The rear shell is part of the casing linked to the sowing machine's frame (not illustrated) and has a seed inlet (3). Both shells are joined peripherally, for example mutually abutting the peripheral flanges (4a, 4b) which are joined or linked by means known in the for this purpose.

The metering plate (5), has in known manner at least one annular crown of seed cells (6) placed on its surface (5a) facing the inner surface (1a) of the rear shell (1) of said casing. This at least one set of annular seed cells Is arranged adjacent to the metering disk (5) perimeter. Disk (5) following said annular set of seed cells (6) and towards its axis (7), presents an annular recess (8), which is preferably achieved by projecting an ideally annular wall portion (9) parallel to axis (7) towards the internal face (2a) of the front shell (2). The end of said annular wall portion (9) which extends for a length between 15 mm to 60 mm. is continued by a wall (10) preferably perpendicular to (9) extending in direction of axis (7) preferably in a length between 20 mm to 70 mm.

Proximal to the inner end of (10), projects a toothed ring gear (11) with male teeth towards the inner face (1a), that is, directed towards the annular wall (9), so that in between components (9, 10, 11) defines the annular recess (8) open towards (1a). Ideally this ring gear (11) is supported by a plurality of radial brackets (12) which in turn bear against a conical surface (13) of disk (5).

Said conical wall (13) projects, preferably obliquely, towards the internal face (1a) of rear shell (1) until reaching the axis of disk (5) wherein it defines a first cylindrical bushing (14) coaxial to the shaft (7). This bushing (14) projects towards the frontal shell's (2) inner surface.

Wall portion (9) of recess (8) faces an annular flange (15) belonging to a plate (16). This plate (16) constitutes a continuous surface (17) having and axial passage (18) through which the shaft (7) passes through. A cylindrical gear (19) is cooperatively engaged in the annular ring gear (11) which is driven in rotation by a shaft (20) passing through the continuous surface (17) and driven by a motor means (21), such as a small electric motor.

In a preferred embodiment, disk (5) is performed in one single piece, the walls defining housing (8) together with the conical surface (13) of the disk (5) and the first cylindrical bushing (14) forming a single monolithic piece. Likewise, plate (16) together with the annular flange (15) defines another monolithic single component. Plate (16) remains stationary while the disk or metering plate (5) is made to rotate on its axis (7), driven either by the cylindrical gear (19) or by impressing a rotation movement on shaft (7).

The function of plate (16) is twofold:
a) First, creating a labyrinth between its annular flange (15) and the annular wall portion (9) of the metering disk or plate (5). This labyrinth is increased by a perimetral extension (22) of plate (16). This labyrinth, together with the centrifugal drive of the disk (5) when rotating with respect to plate (16), defines an efficient barrier against the entry of powders and seeds or seed fragments into the recess (8) wherein gear (19) engages with ring gear (11);
b) on the other hand, the existence of the plate (16) determines the separation of the casing's interior volume surface (5a) of the metering disk and the inner surface (1a) of casing's rear shell (1) in two volumes not communicating with each other; a first of said volumes (23) communicates with the seed inlet and the at least one annular set of seed cells (6), while a second volume (24), separated and isolated from the first, defines a zone free of dust and seeds wherein performs the cylinder gear and the annular ring gear (11), by means of which the present invention ensures that no dust and seeds or parts thereof that could be split by the action of the gears (11, 19) may lodge into the seed cell recesses.

Figure 3:
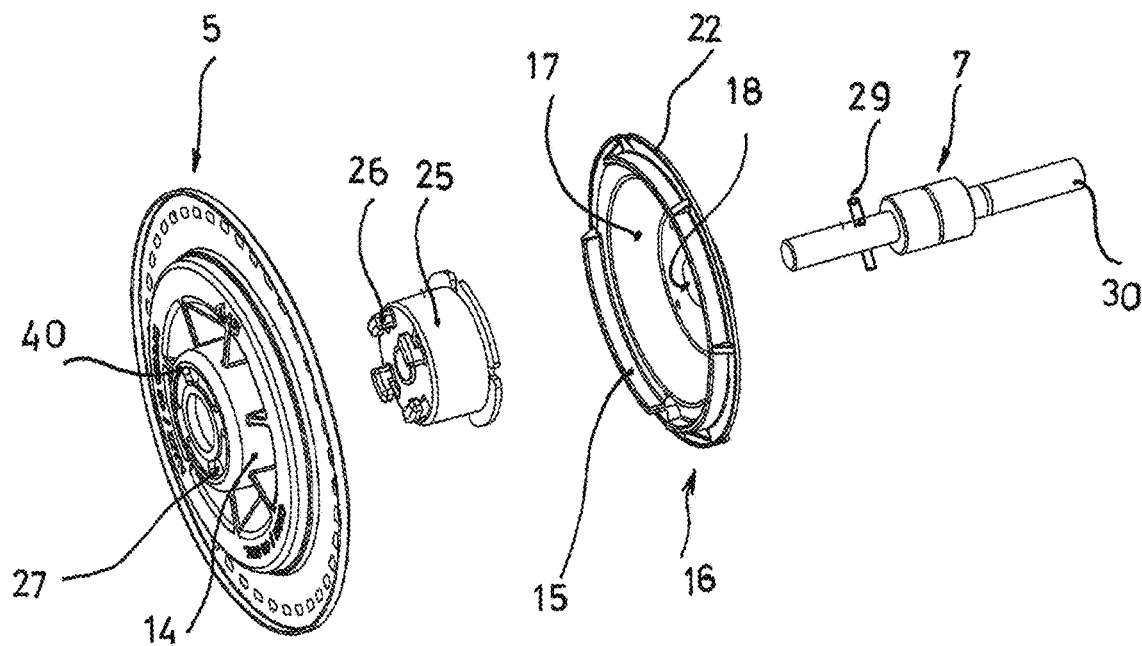
FIG. 3 depicts an exploded perspective view of the components of the present invention projected from the front end of the casing, having removed its rear shell portion and the front shell.
Figure 6:
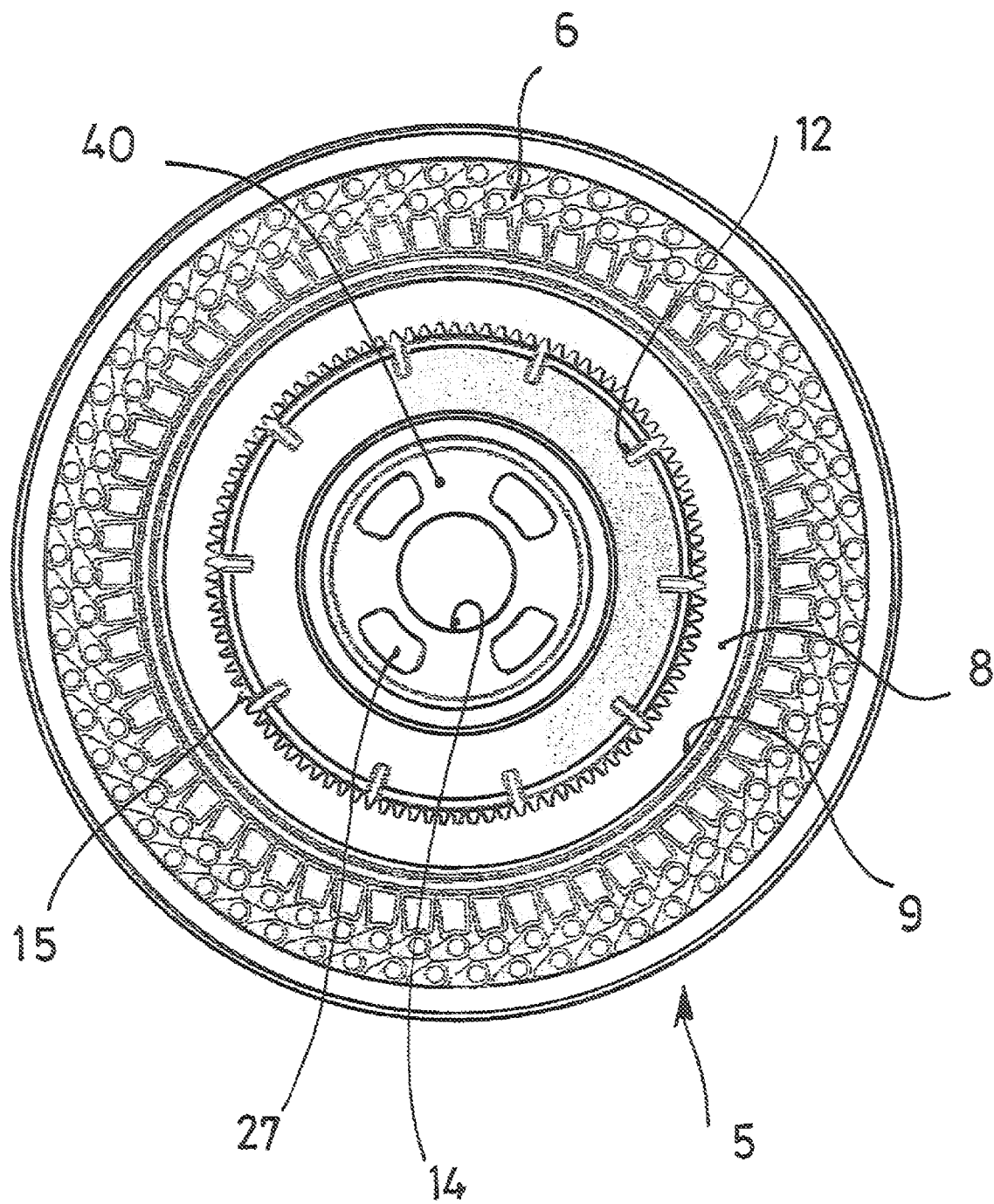
FIG. 6 illustrates a frontal view of the metering disk of the invention that has the at least one annular set of seed cells and the locking means of the disk cooperating with the locking means of the second hub according to FIG. 5.
Figure 7A:
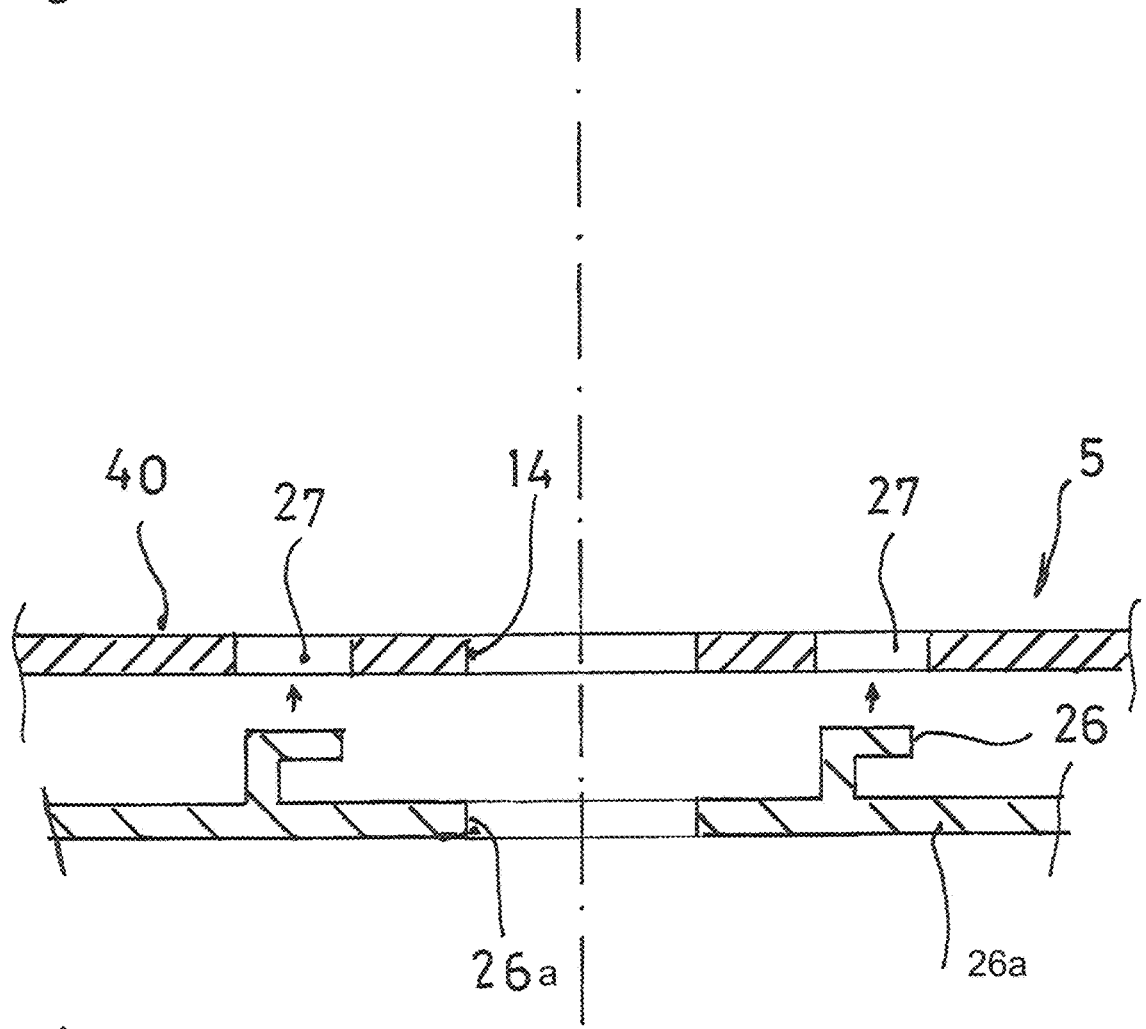
FIG. 7a schematically depicts a very simplified form of the end (40) of the first bushing (14) showing under it in a disengaged situation, the end of the second bushing with the crown projections (26)
Figure 7B:
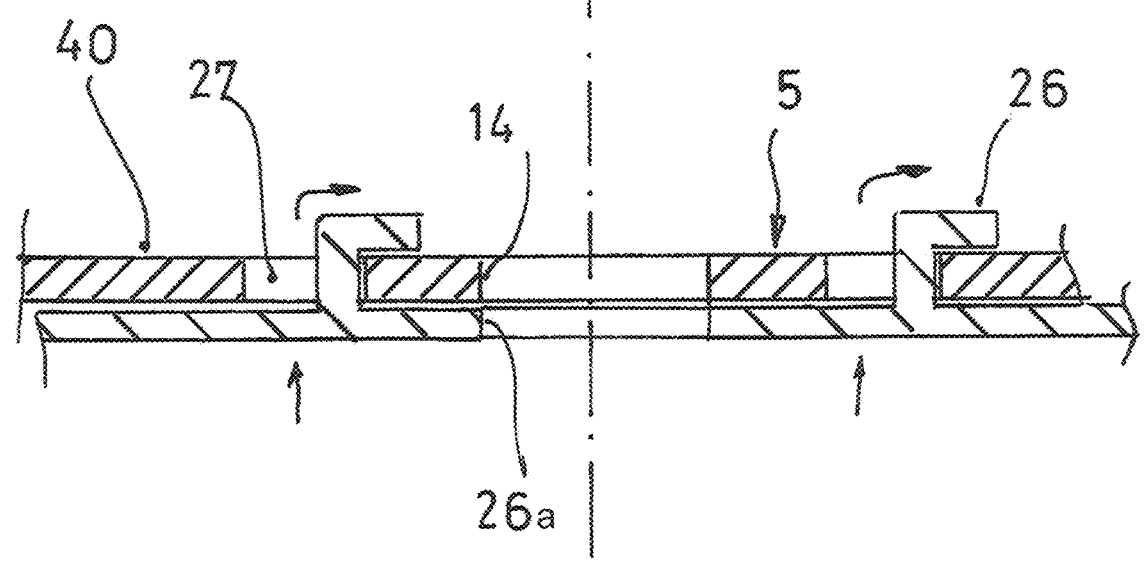
FIG. 7b shows the same components duly assembled.

Inside and coaxial to said first cylindrical bushing (14) sits second bushing (25) coaxial to the first, having the end (39) of the second bushing (25) means (26) for locking disk (5) with respect to the second bushing, cooperating with eyelets (27) (see FIGS. 3 and 6) made at the end of the first bushing. The projections (26) emerge in a flat surface (26a) of the second bushing (25). This arrangement integrates both bushings (14, 25) and therefore the metering disk (5). The second bushing (25) has its end directed towards the internal face (1a) of the rear shell (1) of the casing wherein a seat (28) (see FIG. 4) in which sits a lock (29) integral with the shaft (7), so that every torsional moment applied to the rear end (30) of the shaft, drags the disc (5) in its rotation, this being the second selective alternative of rotation of the metering disc and applied externally on the shaft of the plate from the rear shell (1) of the casing.

Figure 2:
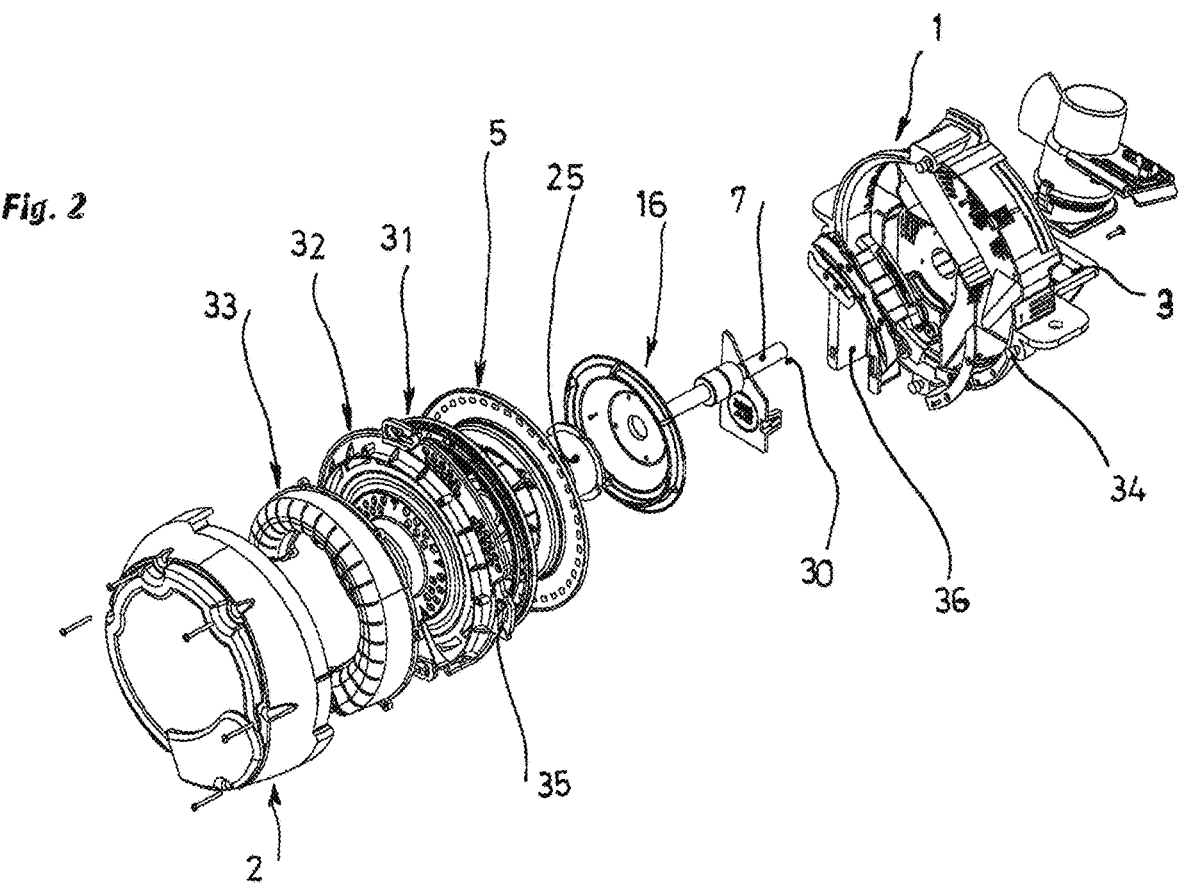
FIG. 2 illustrates an exploded and perspective view of the main parts of the metering unit of the present invention, completed with all the accessories of the prior art allowing its operation condition.

As already mentioned, FIG. 2 illustrates in an exploded and perspective view the full components of the metering device according to this present invention, completed with all the accessories of the prior art that necessary to perform. This figure is given in order to fully illustrate all the means that make up said device, even though the following components do not form part of the invention because they are of public order. Analysing said FIG. 2 from right to left, the presence of a partially annular gasket (31) is observed, which together with components (32, 33) make up the vacuum means that allow sucking, housing, retaining and transporting a seed in each seed cell (6), until said is released for its deposition by falling through conduit (36). It can also be seen in this figure that shell (2) can be assembled with (33, 32, 31) in such a way that, in a known manner, turning this last assembly allows the lugs (35) to be released from the protruding fixing bolts (34), leaving the metering disk (5) exposed to, according to the present invention, to proceed to its simple removal and exchange for another disk.

Figure 4:
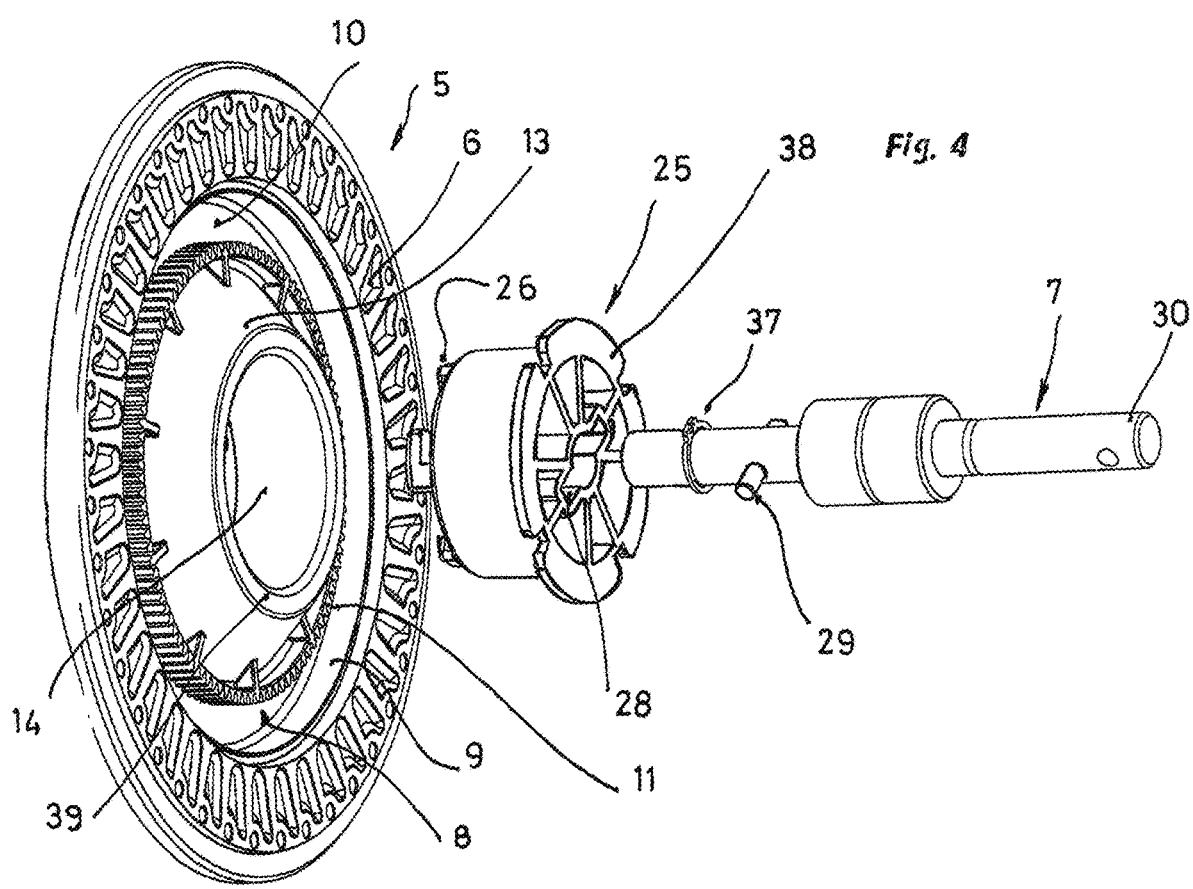
FIG. 4 illustrates in perspective an exploded view of the components of the present invention projected from the rear face of the metering disk, without the casing's rear shell and its front shell.
Figure 5:
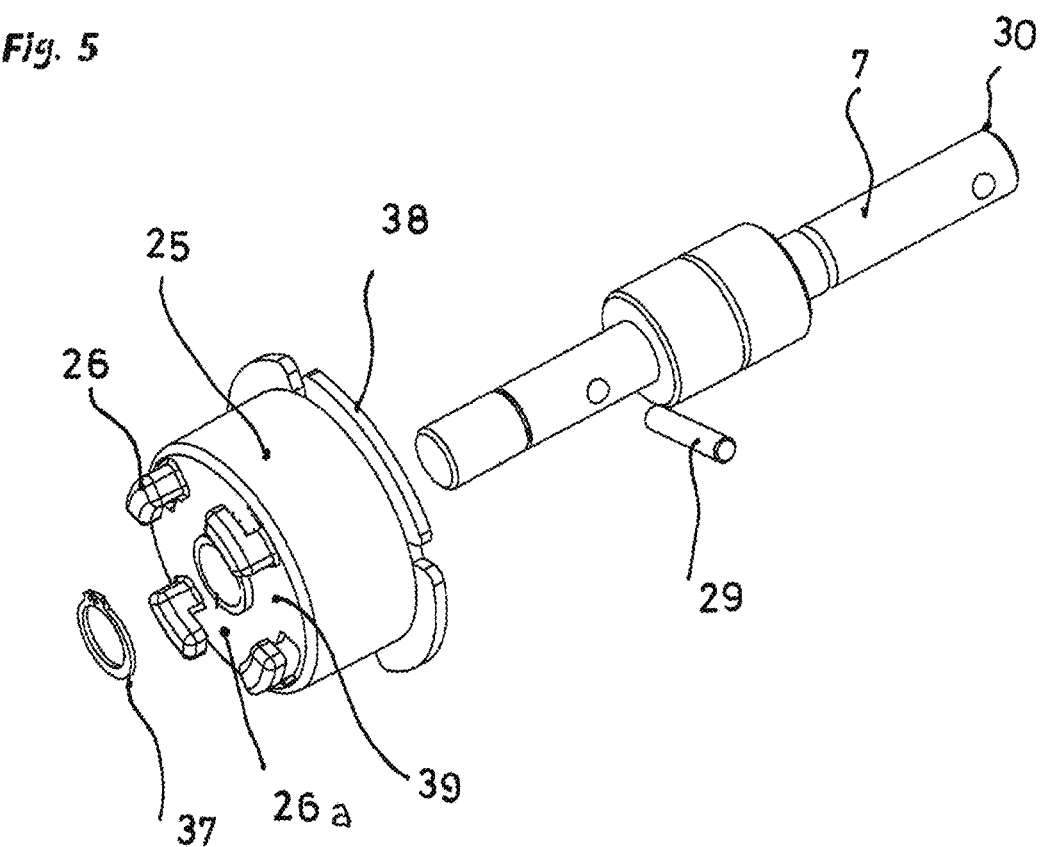
FIG. 5 illustrates in isolated perspective an exploded view of the components of the retention means of the second hub and the axial drive shaft, according to the invention, projected from the front end of the metering device.

At FIG. 4 it can be seen that the rear end of the second hub (25) has a diametrical seat (28) inside which houses a bolt (29) transverse to shaft (7). By means of a retention element, such as a Seeger ring (37), this shaft (7) is retained against the front face (39) of the second bushing (25), so that when shaft (7) rotates, it also rotates this second hub (25), and its forward displacement is prevented by means of the rear perimeter annular shoulder (38) which rests against the edge (39) of the rear end of the first hub (14).

The front end (39) of the second hub has a series of bayonet projections (26) within which the eyelets (27) of the metering plate or disk (5) is cooperatively retained. To this end, the front end of the first hub (14) has an annular wall (40) in which the eyelets (27) are made, arranged as a crown coaxial to shaft (7). Upon penetrating the projections (26) in the form of a crown arranged in a complementary manner inside the eyelets (27) and overcoming the thickness of (40), by means of a rotation the flanges of 27 adjusts against surface (40) causing the immobilization of the disc (5) without using any tool.

The invention claimed is:

1. A seed metering device for an agricultural machine comprising:
a vertical casing including a rear shell and a front shell, the rear shell and the front shell are peripherally connected defining an interior space;
a metering plate or disk located at the interior space of the vertical casing;
a seed inlet located at the rear shell of the casing, wherein seeds are picked by a pneumatic vacuum source and placed within a plurality of annularly arranged seed cells located on the metering plate or disk, forming at least one crown of cells adjacent to a periphery of said metering plate or disk, the metering plate or disk is in communication with said seed inlet;
wherein the metering plate or disk is connected to a motor that is connected to an axis of the metering plate or disk and to an annular set of teeth forming a ring gear, the ring gear is engaged to a cylindrical gear driven by the motor;
wherein when the metering plate or disk rotates, the seeds inside said seed cells are released, wherein the released seeds are directed to an outlet in communication with a sowing furrow;
an annular recess located on the metering plate or disk near the seed cells;
wherein said annular recess is formed by a wall portion that is parallel to the axis of the metering plate or disk and projects towards an inner face of the front shell, wherein an end of the wall portion includes the ring gear ring gear includes male teeth projecting towards the inner surface of the rear shell;
wherein the wall portion includes an oblique wall projecting towards the inner surface of the rear shell until reaching the axis of the metering plate or disk and ends in a cylindrical bushing coaxial to a shaft of the metering plate or disk, the cylindrical bushing that projects towards the inner surface of the front shell;
a plate including an annular flange located in the wall portion, the plate includes a hole through which the shaft passes the annular flange is parallel to said wall portion;
wherein the axis of the metering plate or disk passes through said plate forming a separation of the interior space of the casing between said metering plate or disk and the inner surface of the rear shell producing a first volume and a second volume that does not communicate with each other;
the first volume communicates with the seed inlet and the at least one annular crown of seed cells, the second volume defines an area free of dust and seeds;
wherein a second bushing sits in the cylindrical bushing, the second bushing is coaxial with cylindrical bushing, an end of the second bushing includes a locking device for locking the metering plate or disk with respect to the second bushing, cooperating with seats made at an end of the cylindrical bushing;

wherein the rotational movement is being applied externally on the axis of the metering plate or disk from the rear shell of said casing.

2. The seed metering device according to claim 1, wherein the wall portion of the metering plate or disk comprises the portion that projects parallel to the axis, a portion that projects parallel to the front shell, followed by a portion perpendicular to the axis, after which presents the oblique wall that projects towards the rear shell.

3. The seed metering device according to claim 1, wherein the metering plate or disk, is a single monolithic body.

4. The seed metering device according to claim 1, wherein the plate and the annular flange; forms a single monolithic piece.

5. The seed metering device, according to claim 1, wherein the locking device has on a front face a series of eyelets arranged as a crown around an axis of the metering plate or disk, cooperating with a plurality of projections complementary to said eyelets, each one of the eyelets forming an "L" arranged in the shape of a crown and integral with a front face of the second bushing, each projection determining adjustment of the front face of the cylindrical bushing against "L" wings of each projection establishing a stable and selectively detachable relationship.

* * * * *